2 Sheets—Sheet 1.
E. N. SMITH.
MACHINE FOR FOLDING PAPER.
No. 662. Reissued Feb. 8, 1859.
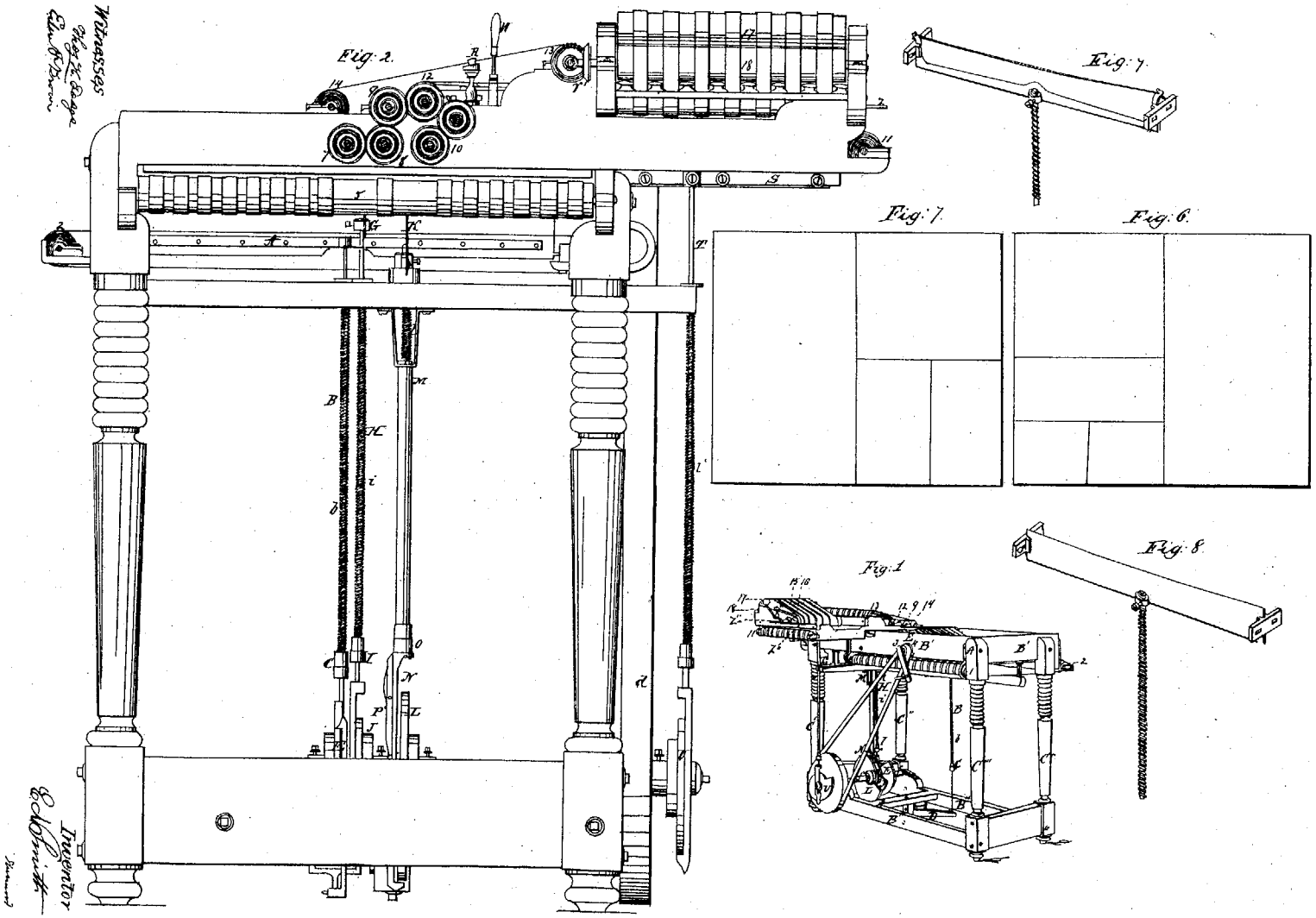

2 Sheets—Sheet 2.
E. N. SMITH.
MACHINE FOR FOLDING PAPER.
No. 662. Reissued Feb. 8, 1859.
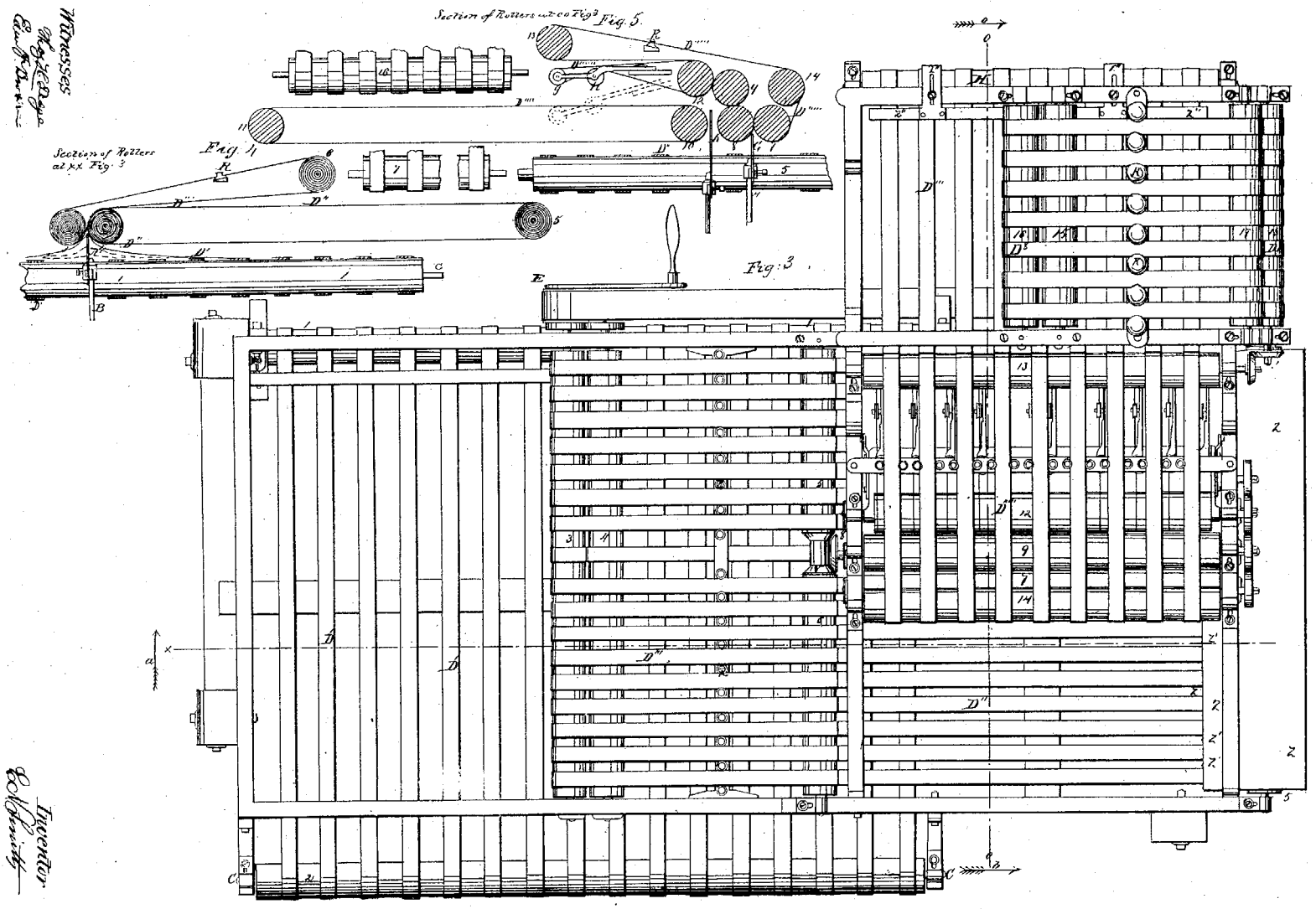
Witnesses
Thos. H. Dodge
Edw. F. Brown
Inventor
E. N. Smith

UNITED STATES PATENT OFFICE.

EDWARD N. SMITH, OF WASHINGTON, DISTRICT OF COLUMBIA, ASSIGNOR, BY MESNE ASSIGNMENTS, TO S. T. BACON.

IMPROVEMENT IN MACHINES FOR FOLDING PAPER.

Specification forming part of Letters Patent No. 6,896, dated November 27, 1849; Reissue No. 186, dated January 7, 1851; Reissue No. 662, dated February 8, 1859.

*To all whom it may concern:*

Be it known that I, EDWARD N. SMITH, formerly of West Brookfield, in the county of Worcester and Commonwealth of Massachusetts, now of the city and county of Washington, in the District of Columbia, have invented certain new and useful Improvements in Machines for Folding Sheets of Paper, of which the following is a full, clear, and exact description, reference being had to the accompanying drawings, which form part of this specification, and in which—

Figure 1 is a view in perspective of my automatic paper-folding machine. Fig. 2 is an elevation of the end of the machine at which the folded paper is discharged. Fig. 3 is a plan showing the arrangement of the endless carrying-bands, folding-surfaces, and rolls. Fig. 4 is a vertical section at the line *x x* of Fig. 3, looking in the direction indicated by the arrows *a a*. Fig. 5 is a vertical section at the line *o o*, Fig. 3, looking in the direction indicated by the arrows *b b*. Figs. 6 and 7 are plans of sheets of paper, showing the various foldings. Fig. 8 represents the curved-edged knife, together with one of the guides for squaring it with the print or register of the sheet. Fig. 9 represents how a cord may be used for the purposes of folding paper.

I will now proceed to describe the construction and operation of my improved machine for folding sheets of paper a number of times consecutively, and which is represented in the accompanying drawings.

This machine consists of a strong frame supporting a number of revolving rolls, and upon which run carrying-bands and folding aprons, as hereinafter described. Some of the rolls are arranged in pairs with a long narrow opening or slot between the rolls of each pair, into which the extended sheet of paper is struck by a curved-edged knife to make the fold.

The paper, after being folded by passing through the opening, is carried to the next opening to receive another fold upon an endless moving apron, composed of parallel yielding belts encircling one of the rolls which form the sides of the opening, and a corresponding tightening-roll parallel thereto and placed beyond the next opening into which the paper is to be struck. There is in most cases a second shorter moving apron which encircles the other roll of the pair, between which the fold is struck, and a corresponding tightening roll placed a little above the carrying-apron, at a short distance from the opening. This shorter apron in passing from the roll at the opening to its tightening roll is deflected by the roll on the opposite side of the opening, and therefore presses upon the carrying-apron. The adjacent surfaces of the two aprons are moved in the same direction, and as they converge seize the fold of paper struck up between them by the knife, and compress and carry it forward. These moving-aprons, with their rolls and knives, are operated by suitable machinery, which is mounted with them on the frame.

The frame of the machine, which is of a rectangular form, is composed of upright posts $c'$ $c''$ $c'''$ $c''''$, connected by upper and lower horizontal side and end rails, B′ B′ and B″ B″.

To the sides of the frame are attached the bearings A″, in which the journals C of the rolls 1 and 2 are supported. These rolls are parallel, their peripheries move with equal velocity, and the two are surrounded by a set of parallel endless aprons or bands, the tops of which constitute a plane surface, D′, on which the extended sheet of paper to be folded is received and carried forward in the direction indicated by the arrows in a plane parallel with the first pair of folding-rolls. Between the central bands of this surface, and parallel in direction with them, is a curved-edged knife, A, supported by a vertical rod or stem, B, to which a vertical reciprocating motion is given by a cam, E, and by a helical spring, *b*, coiled upon the vertical stem, the cam E being secured to a horizontal shaft, *f*, turning in bearings attached to the lower side rails, B″, of the frame. The cam acts to depress the knife A below the moving surface D′, Fig. 4, on which the paper is extended, and at the same time strains the spring *b*. As the shaft revolves the rod is liberated and the spring *b*, contracting again throws the upper knife, A, suddenly upward, the edge thereof striking the moving paper across its middle, forces it upward into an opening or slot between the adjoining flexible and yielding surfaces of two sets of endless aprons, D″ D‴, respectively moving on two rollers, 3 4, which are parallel with each other and revolve at right angles to the continuously-moving surface D′. These endless aprons or bands are of unequal length. The longer, D″, passes off horizontally and returns round a tightening-roll, 5, parallel with the first two rolls 3 and 4. It forms the second continuously-moving plane surface on which the paper is carried forward until it is arrested in its further progress by a stop, Z, as shown at Fig. 3, attached to the main framing just above the roll 5. The functions of this stop are twofold, viz: First, that of arresting and retaining the sheet in the proper position to be acted upon by the second folding-knife, and thus obviating the necessity of that delicate adjustment of the moving parts of the machine which is essential when the paper is forced between the folding-rolls, while the sheet is upon the run, as is the case in obtaining the first fold; second, it performs the important office of regulating and truing the once folded sheet preparatory to its receiving a second fold by being struck upward by a second knife, G, into a second opening, to be seized in turn by a second set of aprons or bands.

The shorter endless band D‴, after pressing against the first D″ sufficiently long to seize the paper and draw it upon the second moving surface, diverges from it and returns over a roller, 6, revolving above the longer band.

By multiplying the sets of endless aprons or bands and folding-edges, any required number of folds may be at right angles to each other, or by varying the angle of the bands and folding-edges any desired angle may be given to the folds with respect to each other.

It is frequently necessary that the lines at which successive folds are made shall be parallel. To accomplish this result the arrangement of aprons or bands and knives is varied, as shown in Fig. 5. The longer folding apron or band D⁗ does not run directly upon one, 8, of the two rollers, 7 8, forming the opening between which the knife G strikes the sheet, but upon a third roll, 10, which has its axis in the same plane and parallel with those of the first two, and is separated by a narrow space from them. Through this space a second knife, K, is projected upward against the paper, struck up by the first knife G and passing over the space to the horizontal apron or band D⁗. This second knife forces the paper upward into an opening between two yielding aprons, D′′′′′ D′′′′′′, which run on a pair of parallel rolls, 9 12, revolving directly above the space between the two lower rolls, 8 10, through which this second knife, K, is projected. One of these aprons, D′′′′′, is the short one, which has already acted in making the first fold, and which is bent out of its direct course to the tightening-roll 13 by this second pair of folding-rolls. The other band is tightened by passing its several members over a set of small pulleys, *g* and *h*, hung upon a movable bar operated by lever W, all having the same common axis. This set of tighteners can be moved up or down in a circular arc of which the axis of the folding-roll 12 is the center.

When the parallel folding is required, the second folding-edge K is put in gear, and the tighteners *g* and *h* of this short endless band are depressed to deliver the folded paper upon the horizontal band D⁗. When this parallel folding is not required, the second folding-edge K is thrown out of gear, the tighteners are raised, and the sheet folded by the first parallel folding-edge, G, passes directly to the horizontal band D⁗, from which it is struck in a line at right angles to the fold formed by knife G.

The machine represented in the drawings is arranged to fold paper four times, in the manner shown in Fig. 6—the first fold being across the paper, the second being at right angles to the first, the third parallel to the second, and the fourth at right angles to the third fold. The first fold is made by striking the paper up between the continuously-moving flexible and yielding aprons upon the rolls 3 and 4 while the sheet is upon the run, by means of the curved-edged knife A, which is operated by the spring *b* and cam E, acting upon a stem, B, to the upper extremity of of which the knife is secured. The paper is seized in the opening by yielding aprons D″ D‴, running on the rolls 3 and 4, and is conveyed upon the apron D″ until it reaches the stop Z, when it is struck upward into a second opening by the knife G, operated by a cam, J, and spring *i*, acting upon its stem H, to be seized by the roll 8 and the yielding apron running on the roll 7.

K is the third folding-knife with its stem M, cam L, and spring *l*. 9 and 12 are the third folding-rolls.

The horizontal apron D⁗ receives the paper after the third fold is made and conveys it forward until it is arrested by the stop Z″, as fully shown in Fig. 3, to be acted upon by a fourth knife, S, operated by cam U, and spring *l′*, acting upon its stem T, from which it is seized by the yielding aprons $D^7$ and $D^8$, running upon the folding-rolls 15 and 16 and carried forward to and between the pressing and discharging rolls 17 and 18.

To provide for the accurate folding of paper varying in size, it is requisite that the stop should be so constructed as to be readily adjusted to arrest the sheet at any given point on the carrying-bands. One mode in which this is accomplished is shown in Fig. 3, where stop Z″ is provided with slots and set-screws. The stops are shown as being placed above the carrying-bands, but they have projections extending downward between said bands, as shown at Z′.

The power of the prime mover is applied directly to the pulley E on the shaft of the roll 3 and thence by belts and geared wheels *v* and *v′* to the several members of the machine.

The folding-machine thus constructed may be applied directly to the power printing press and receive the sheets upon the continuously-moving carrying-bands D′ as fast as they are printed.

The paper may be delivered outside of the machine after one or more folds have been made without liability of its being entangled in the working parts of the machine, by throwing the remaining folding-edges out of gear and removing the stops; or a fold may be omitted, as in Fig. 7, where the third fold of Fig. 6 has not been made. The folding-edges may be thrown out of or into gear with their respective cams by the arrangement represented at C I M N O P Fig. 2, or in any other convenient manner.

It may be well to remark, in this connection, that the paper being thin, and in many instances damp, the use of stops to arrest the sheet prior to its receiving its first fold would be attended with difficulties and objections, inasmuch as there would not be sufficient substance or strength in the sheet to prevent its being carried forward and wrinkled or rolled up against the stop. To obviate this difficulty I so arrange and time the action of the knife as that it shall act upon the paper to form the first fold while the sheet is upon the run.

To insure greater certainty in the action of the machine, the rolls 3 and 4 are placed a short distance apart, so as to permit of yielding aprons or bands being used, as shown in the drawings. These aprons or bands cover about three-fourths of the length of the rolls and may be made of any yielding flexible material, such as cloth, gutta-percha, &c. This arrangement admits of the paper being forced by the knife between continuously-moving converging and yielding surfaces to form the folds and thus avoid the danger of the knife being caught between the rolls, while at the same time it insures the more accurate progress of the sheet to be folded and with less liability to its being torn than would be the case if folded between unyielding surfaces.

The knife used for forcing the sheet between the folding surfaces, as well as the guides for squaring it with the print or register of the sheet, are more fully shown in Figs. 8 and 9.

It will be seen by reference to Fig. 9 that a cord may be made to perform the functions of the knife to a certain extent, inasmuch as when supported at each end it naturally assumes the form of a curve, so that when forced up against the paper the edges of the paper will be carried between the folding surfaces a little in advance of the center of the sheet, thus avoiding a liability of the sheets wrinkling while being folded.

The folding-aprons as before stated, cover about three-fourths of the entire length of the folding-rolls, in the narrow spaces between which, as shown in the drawings, are placed guides R, for the purpose of preventing the aprons from overriding each other or otherwise interfering with the proper course of the sheet.

In order that the machine may be used readily and with advantage in folding paper, the printed pages of which are of different sizes, the folding-rolls are supported in boxes, bearings, or frames, as shown in the drawings, so as to permit of their being moved toward or from each other, as well as laterally. By this construction and arrangement the rolls and folding surfaces may be squared to the print and knife with great accuracy.

It is also necessary that the knife should be supported in such a manner as to be quickly set in different positions in order to render the machine capable of being used with advantage to fold paper varying in both size of sheet and print.

By reference to Fig. 3, it will be seen that the folding-roll 8 is geared to the roll 6, at or near its center and at right angles thereto, the said gearing being placed between the aprons or bands which run upon said roll 6, as fully shown in the drawings. By this construction and arrangement, the folding-roll 8, which is necessarily so placed that the space or opening between it and the roll 7 shall be at right angles, or nearly so, to the center of the preceding pair of folding-rolls, is driven in a very direct manner, and consequently the machine is rendered more simple and perfect in its operation than would be the case if additional shafts and gearing were employed to communicate motion to roll 8.

In paper-folding machines it is very desirable to have as few shafts and gears as possible and yet have the working parts of the machine so connected as that they shall move and work in harmony with each other, and by reference to the the mode of driving the second pair of folding-rolls, as fully shown in the drawings, it will be seen that the plan which I have devised tends towards the accomplishment of this object in an eminent degree.

Having described my machine for folding and pressing paper, what I claim, and desire to secure by Letters Patent, is—

1. Forcing the paper required to be folded between the first set of folding-rolls by the the knife while the sheet is on the run.

2. Forcing the paper to form the first fold between two converging and continuously-moving flexible, yielding surfaces.

3. Forcing the sheet of paper required to be folded upward for the purpose specified.

4. The use of a cord or curved-edged knife for the purpose of forcing the sheet between the folding-rolls.

5. The stops for determining the proper position of the sheet for receiving its second and succeeding folds.

6. The combination of the carrying-bands with a stop for regulating the sheet in proper position to receive its second and succeeding folds, as specified.

7. The combination of the rolls and endless aprons or bands with the guides, substantially as described.

8. So arranging the knives, aprons, and rolls in a paper-folding machine as that the sheet may receive two or more parallel folds in succession.

9. So arranging the carrying and folding rolls in a paper-folding machine as that only a single series of endless aprons or bands shall remain in contact with the sheet to conduct it while it is receiving more than one fold.

10. The tightening pulleys and cords or bands hung upon the movable bar for the purpose of giving proper direction to the sheet for receiving its next fold after having received a parallel fold, as described.

11. So constructing a machine for folding paper as that one or more folds may be omitted at pleasure and the folded sheet delivered outside of the frame and working parts of the machine by simply detaching the knives and removing the stops, as described.

12. Supporting the folding-rolls in adjustable boxes, bearings, or frames for the purpose of squaring them with the print or register of the sheet to be folded, and providing for the contraction and expansion of the endless aprons or bands.

13. The movable guides for the purpose of squaring the knives to correspond with the print or register of the sheet.

14. Conveying motion to any pair of folding-rolls running at right-angles to the preceding pair by means of bevel-gears placed at or near the center of a roll and between the aprons or bands, substantially as shown, whereby the machine is rendered more simple and perfect in its operation.

15. Pressing the folded sheet previous to its delivery by passing it between two converging and continuously-moving yielding surfaces.

E. N. SMITH.

Witnesses:
THOS. H. DODGE,
EDM. F. BROWN.